United States Patent
Ozawa et al.

(10) Patent No.: US 6,674,629 B2
(45) Date of Patent: Jan. 6, 2004

(54) CONTROLLER FOR CONTROLLING AN ELECTROMAGNETIC ACTUATOR

(75) Inventors: Hidetaka Ozawa, Saitama (JP); Kenji Abe, Saitama (JP); Yoshitomo Kouno, Saitama (JP); Minoru Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 158 days.

(21) Appl. No.: 10/042,315

(22) Filed: Jan. 8, 2002

(65) Prior Publication Data

US 2002/0088956 A1 Jul. 11, 2002

(30) Foreign Application Priority Data

Jan. 9, 2001 (JP) ........................................ 2001-001843

(51) Int. Cl.[7] .............................................. H01H 47/32
(52) U.S. Cl. ...................... 361/154; 361/170; 361/187; 361/152
(58) Field of Search ................................ 361/152, 154, 361/170, 187, 153, 178

(56) References Cited

U.S. PATENT DOCUMENTS 4,544,986 A * 10/1985 Buchl .......................... 361/152
6,249,418 B1 * 6/2001 Bergstrom ................... 361/152
6,366,441 B1 * 4/2002 Ozawa et al. ................ 361/170

* cited by examiner

Primary Examiner—Anthony Dinkins
(74) Attorney, Agent, or Firm—Lahive & Cockfield, LLP

(57) ABSTRACT

A controller for an electromagnetic actuator is provided that enables detection of a minute movement of the armature leaving the seating position and carries out pullback operation responsive to such detection. The electromagnetic actuator has a pair of springs acting on opposite directions, and an armature coupled to a mechanical element such as a exhaust/intake valve of an automobile engine. The armature is held in a neutral position given by the springs when the actuator is not activated. The actuator includes a pair of electromagnets for driving the armature between two end positions. The controller having current supplying means for supplying holding current to the electromagnet corresponding to one of the end positions when holding the armature in said one of the end positions. The controller includes determining that the armature is leaving (falling or lifting) the seated position when the holding current increases more than a predetermined value while the holding current is supplied to the electromagnet corresponding to said end position. Leaving armature is detected based on the variation of the holding current, which allows earlier detection of the leaving armature.

18 Claims, 14 Drawing Sheets

(a)

(b)

(a)

(b)

CONTROLLER FOR CONTROLLING AN ELECTROMAGNETIC ACTUATOR

BACKGROUND OF THE INVENTION

The invention relates to a controller for controlling an actuator for a magnetic valve, and more specifically to a controller for an electromagnetic actuator for driving a valve of an engine mounted on such apparatus as an automobile and a boat.

Valve driving mechanism having an electromagnetic actuator has been known and called a magnetic valve. An electromagnetic actuator typically includes a moving iron or an armature which is placed between a pair of springs with given off-set load so that the armature positions at an intermediate part of a pair of electromagnets. A valve is connected to the armature. When electric power is supplied to the pair of electromagnets alternately, the armature is driven reciprocally in two opposite directions thereby driving the valve. Conventionally, the driving manner is as follows.

1) The magnetic attraction power that one of the electromagnets provides to the armature overcomes rebound power by the pair of springs and attracts the armature to make it seat on a seating position. The armature (valve) is released from the seating position by such a trigger as suspension of power supply to the electromagnet, and starts to displace in a cosine function manner by the force of the pair of springs.

2) At a timing according to the displacement of the armature, an appropriate current is supplied to the other electromagnet to produce magnetic flux which generates attraction force.

3) The magnetic flux rapidly grows as the armature approaches the other electromagnet that is producing the magnetic flux. The work by the attraction power generated by the other electromagnet overcomes the sum of (i) a small work by the residual magnetic flux produced by the one electromagnet which acts on the armature to pull it back and (ii) a mechanical loss which accounts for a large portion of the sum of work. Thus, the armature is attracted and seats on the other electromagnet.

4) At an appropriate timing as the armature seats, a constant current is supplied to the other electromagnet to hold the armature in the seated state.

In maintaining the armature in the seated state, it is desirable to supply the minimum driving current that can hold the armature in the seated state so as to minimize power consumption. However, when a minimum current is used every time the armature is to be held in the seated state, the armature moved to a seating position may from time to time leave the seating position due to secular changes of the electromagnetic actuator and/or variations of the movement. When the armature falls or lifts (collectively referred to as "leave") from the seating position, such situation needs to be detected immediately and power supply needs to be boosted to pull the armature back to the seating position.

Conventionally, leaving of the armature was detected based on signals from a displacement sensor that detects displacement of the armature. Specifically, leaving (falling or lifting) of the armature is determined by detecting a situation that the sensor output does not indicate seated state of the armature in the period that the armature is in the seated state. In response to determination of leaving of the armature, a large current is supplied to the windings of the electromagnet to activate pullback operation immediately so that the armature may be pulled back to the seating position.

However, the conventional method includes the following problems. The air gap between the armature and the yoke of the electromagnet is very small when the armature is seated. The electromagnetic actuator has a very small magnetic reluctance when the armature is seated. When a constant current is supplied for holding the armature in the seated state, if the armature leaves the seating position by a small distance for some reasons, say less than 10 $\mu$m from the seating position, the attraction force decreases. It is very difficult to detect such a small movement with the displacement sensor. For example, when the armature moves in the range of 7 mm in order to open and close a valve of an automobile engine, the displacement sensor can only detect the movement of the armature which is larger than $\frac{1}{100}$ of the moving range. That is, the sensor can only detect armature movement larger than 70 $\mu$m due to noise and performance of the sensor. Leaving (falling or lifting) detection at 70 $\mu$m point is too late to ensure pullback operation of the armature.

In addition, when pullback operation is activated at 70 $\mu$m point, a larger current needs to be supplied, thereby increasing power consumption. This requires to increase the capacity of a driver element such as a field effect transistor, raising the cost of the driving circuit. Furthermore, a large current and the air gap produced by the leaving armature cause a large magnetic energy to be accumulated in the air gap. This magnetic energy is converted into kinetic energy of the armature and valve when the armature is attracted again to the seating position. As a result, seating speed of the armature becomes large producing a large collision sound when the armature seats.

As a specific example, a case for repetitively activating an electromagnetic actuator at a high speed as in the case of a valve train of an engine is described referring to FIG. 15. The left vertical axis shows the magnitude of displacement of the armature (mm) and current (A) supplied to the electromagnet. The right vertical axis shows attraction power (N) and voltage (V) applied to the electromagnet. As shown in the figures, the minimum attraction power (falling limit or leaving limit) that prevents the armature from leaving from the seating position is 485 N.

FIG. 15($a$) shows a case in which the armature seats normally and a stable seated state is maintained. At time 0, the armature is released from one electromagnet and starts to move toward the other electromagnet by the operation of a pair of springs. During the period from time Te to Th, a constant voltage 42V is applied to the other electromagnet (over-excitation operation) to make the armature seat on the other electromagnet. After that, since the attraction force is a little larger than the leaving limit, a stable seated state is maintained. After the armature is seated, switching control of voltages 0 and +12V is performed to supply a constant holding current to the electromagnet.

FIG. 15($b$) shows a case where a seated armature leaves the seating position. A displacement sensor detects the leaving movement of the armature when the armature reaches 70 $\mu$m point, which is 1% of the lift (movement) range of 7 mm. A pullback operation is immediately initiated. The armature reaches 70 $\mu$m point around time 6.33 ms. For 0.5 ms from time 6.33 ms, over-excitation voltage is applied. The voltage application period is determined according to the leaving extent (70 $\mu$m).

After voltage application finished, a holding current value is renewed to a value which is larger than the preset normal holding current value by a predetermined value (for example, the predetermined value is 10% of the normal holding current value). Switching control of voltages of ±12V is carried out until the current converges into the renewed target holding current value. In the example shown in the figure, the switching control is carried out for 0.7 ms. Thereafter, switching control of voltages of +12V and 0V is performed so that current supplied to the electromagnet maintains the target holding current value.

In the example shown in FIG. 15(b), the armature leaves the seating position about 0.22 mm and is pulled back. The energy needed for the pullback is about 0.12 J. The seating speed (not shown) of the armature at pullback is approximately 0.6 m/s, which generates collision noise. Thus, activating pullback operation responsive to detection of the leaving armature by the displacement sensor causes delay in the pullback operation and requires a large energy for pullback. It produces a large seating speed leading to collision noise.

Thus, there is a need for a controller for an electromagnetic actuator which enables detection of a minute movement of the armature leaving the seating position and carries out pullback operation responsive to such detection.

SUMMARY OF THE INVENTION

According to one aspect of the invention, a controller is provided for controlling an electromagnetic actuator having a pair of springs acting on opposite directions, and an armature coupled to a mechanical element. The armature is connected to the springs and held in a neutral position given by the springs when the actuator is not activated. The actuator includes a pair of electromagnets for driving the armature between two end positions. The controller comprises current supplying means for supplying holding current to the electromagnet corresponding to one of the end positions when holding the armature in said one of the end positions. The controller includes means for determining that the armature is leaving the seated position when the holding current increases more than a predetermined value while the holding current is supplied to the electromagnet corresponding to said end position.

According to the invention, leaving armature is detected based on the variation of the holding current, which allows earlier detection of the leaving armature.

According to another aspect of the invention, the controller further comprises pullback means, responsive to determination of leaving of the armature, for applying voltage to the electromagnet corresponding to the end position, thereby pulling back the armature to the end position.

Because pullback operation is activated responsive to detection of leaving armature in terms of variation in the holding current, quick pullback is realized with relatively small energy.

According to further aspect of the invention, the current supplying means raises the holding current by a predetermined value. The holding current is supplied to the electromagnet corresponding to the end position after voltage is applied to the electromagnet by the pullback means.

Because the holding current is set to a relatively large value after the armature is pulled back from leaving, the armature will be prevented from leaving thereafter.

According to an aspect of the invention, the controller further includes setting means for setting the period for applying voltage to the electromagnet by said pullback means, in accordance with the difference between the time the armature leaves the seating position as determined by said determination means and a schedule release time of the armature. When the armature leaves, the period of the pullback operation can be controlled according to the timing of the release movement of the armature.

According to another aspect of the invention, the setting means shortens the period of voltage application to the electromagnet by said pullback means when the difference between the time the armature leaves the seating position as determined by said determination means and a scheduled release time of the armature is equal to or less than a predetermined value. Thus, delay of release operation of the armature is avoided.

According to yet another aspect of the invention, the controller includes a counter for counting the number of times the armature is held in the end position without leaving over a sequence of cycles. When the number of times shown by the counter is larger than a predetermined value, the supplying means decreases the holding current to supply to the electromagnet corresponding to said end position. Thus, optimization of the holding current for respective electromagnetic actuators can be realized.

DESCRIPTION OF THE PREFERRED EMBODIMENTS

Figure 1:
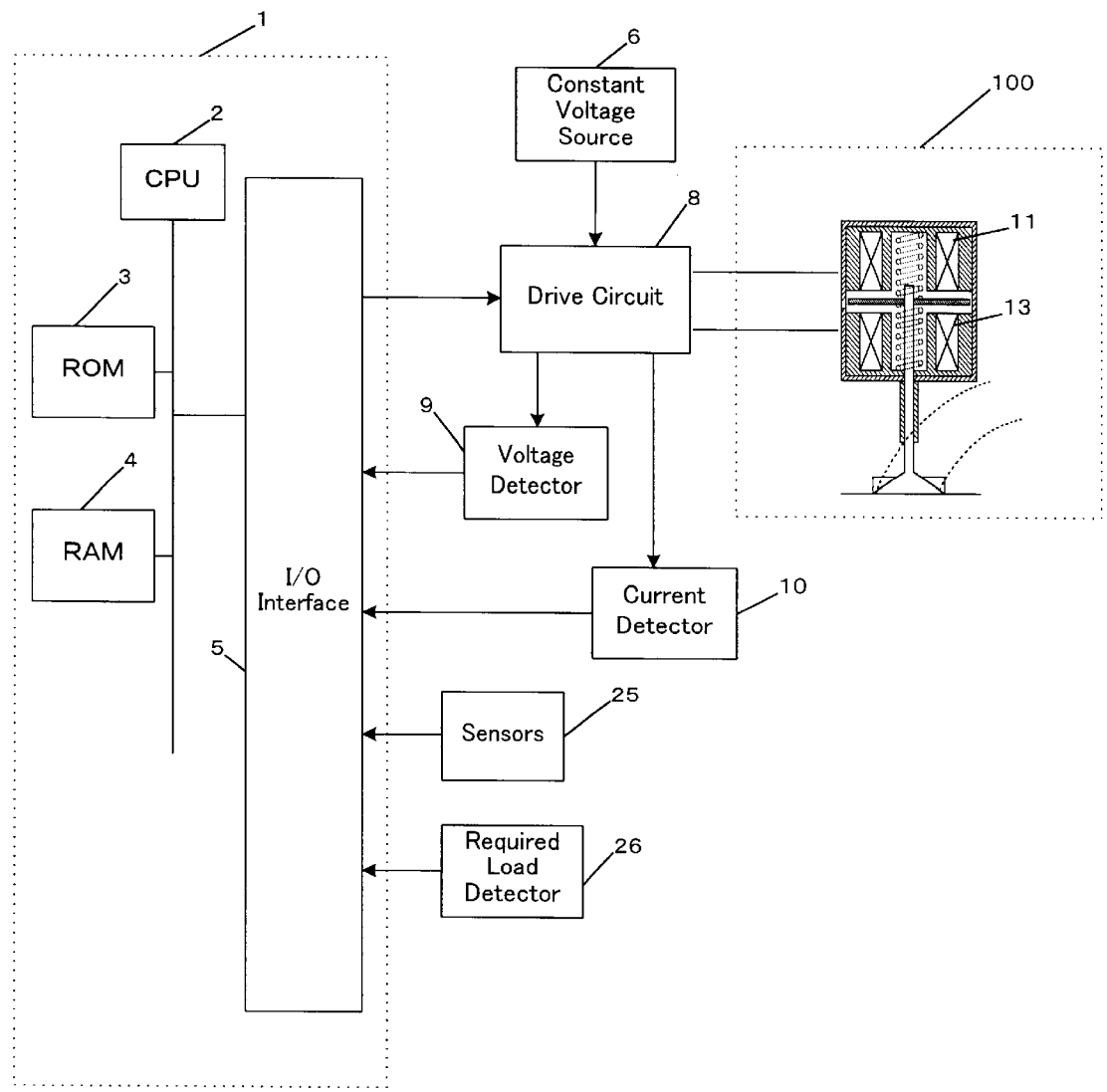
FIG. 1 is a general block diagram of a controller for an electromagnetic actuator according to one embodiment of the invention.

Referring now to the drawings, specific embodiments of the invention will be described. FIG. 1 is a block diagram showing a general structure of a controller for an electromagnetic actuator. A controller 1 comprises a microcomputer which includes a central processing unit 2 (CPU 2), a read only memory (ROM) 3 for storing computer executable programs and data, a random access memory (RAM) 4 providing a working space for the CPU 2 and storing results of operations by the CPU 2. The controller 1 also includes an input-output interface (I/O interface) 5.

I/O interface 5 receives signals from various sensors 25 which include signals relating to engine speed (Ne), engine water temperature (Tw), intake air temperature (Ta), battery voltage (VB), and ignition switch (IGSW). I/O interface 5 also receives a signal indicating desired torque, an output from a detector 26 for detecting a required load. For example, the detector 26 can include an accelerator pedal sensor, which detects the magnitude of movement of an accelerator pedal.

A drive circuit 8 supplies electric power provided from a constant voltage source 6 based on a control signal from the controller 1 to a first electromagnet 11 and to a second electromagnet 13 of an electromagnetic actuator 100. In one embodiment of the invention, electric power for attracting the armature is supplied as a constant voltage, and electric power for holding the armature in a seating position is supplied as a constant current. Constant current control can, for example, be carried out by pulse duration modulation of the voltage supplied from the constant voltage source 6.

A voltage detector 9 is connected to the drive circuit 8. The voltage detector 9 detects the magnitude of the voltage supplied to the first and the second electromagnets 11 and 13, and feedbacks the data to the controller 1. A current detector 10 is connected to the drive circuit 8 and detects the magnitude of the current supplied to the first and the second electromagnet 11 and 13. The current detector 10 feedbacks the data to the controller 1.

Controller 1 determines such parameters as timing of power supply, magnitude of voltage to be supplied, and period of voltage supply, based on inputs from various sensors 25 and required load detector 26 as well as feedback signals from the voltage detector 9 and the current detector 10, and in accordance with the control program stored in the ROM 3. The controller 1 outputs a control signal for controlling the electromagnetic actuator 100 to the drive circuit 8 through the I/O interface 5. Thus, the drive circuit 8 provides optimized current to the first and the second electromagnets 11 and 13 for mileage enhancement, emission reduction and output characteristic enhancement of the internal combustion engine.

Figure 2:
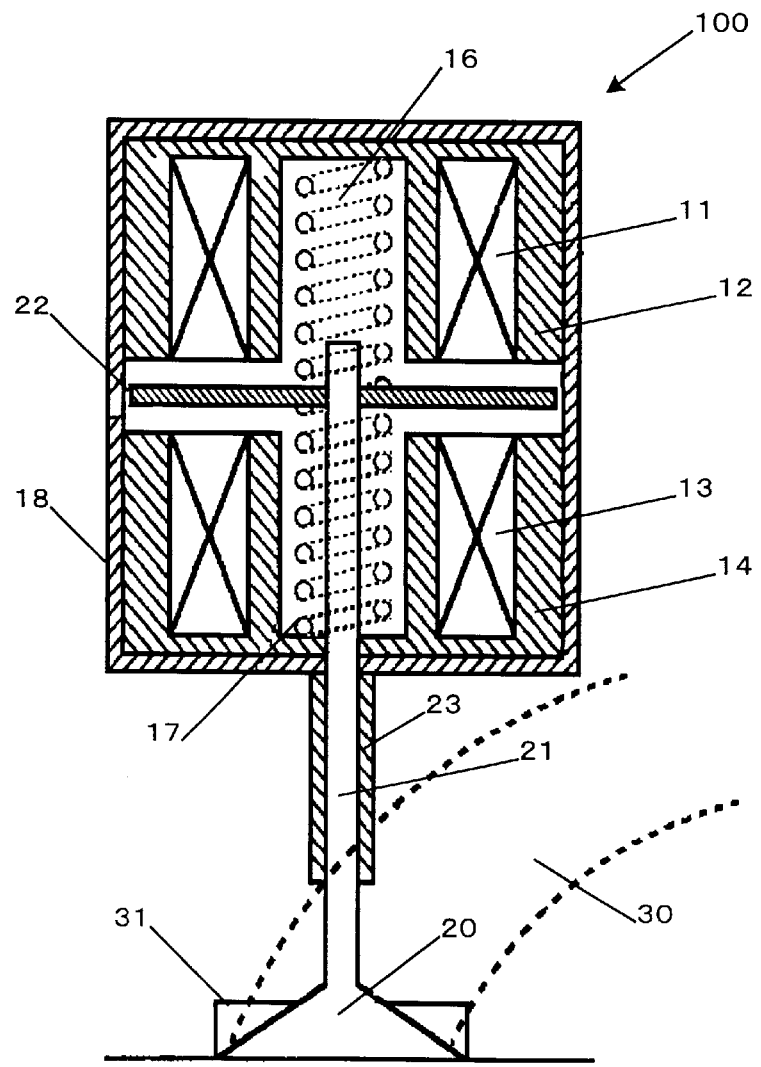
FIG. 2 shows a mechanical structure of an electromagnetic actuator according to one embodiment of the invention.

FIG. 2 is a sectional drawing which shows the structure of the electromagnetic actuator 100. A valve 20 is provided at an intake port or an exhaust port (referred to as intake/exhaust port) so as to open and close the intake/exhaust port 30. The valve 20 seats on a valve seat 31 and closes the intake/exhaust port 30 when it is driven upwardly by the electromagnetic actuator 100. The valve 20 leaves the valve seat 31 and moves down a predetermined distance from the valve seat to open the intake/exhaust port 30 when it is driven downward by the electromagnetic actuator 100.

The valve 20 extends to a valve shaft 21. The valve shaft 21 is accommodated in a valve guide 23 so that it can move in the direction of the axis. A disc-shaped armature 22 made of a soft magnetic material is mounted at the upper end of the valve shaft 21. The armature 22 is biased with a first spring 16 and a second spring 17 from top and bottom.

A housing 18 of electromagnetic actuator 100 is made of nonmagnetic material. Provided in the housing 18 are a first electromagnet 11 of solenoid type placed above the armature 22, a second electromagnet 13 of solenoid type located underneath the armature 22. The first electromagnet 11 is surrounded by a first electromagnet yoke 12, and the second electromagnet 13 is surrounded by a second electromagnet yoke 14. The first spring 16 and the second spring 17 are balanced to support the armature 22 in the middle between the first electromagnet 11 and the second electromagnet 13 when no exciting current is supplied to the first electromagnet 11 or the second electromagnet 13.

When exciting current is supplied to the first electromagnet 11 by the drive circuit 8, the first electromagnet yoke 12 and the armature 22 are magnetized to attract each other, thereby pulling up the armature 22. As a result, the valve 20 is driven upwardly by the valve shaft 21, and seats on the valve seat 31 to form a closed state.

Cutting off the current to the first electromagnet 11 and starting current supply to the second electromagnet 13 will make the second electromagnet yoke 14 and the armature 22 magnetized to produce a force which combined with the potential energy of the springs attracts the armature 22 downwardly. The armature 22 contacts the second electromagnet yoke 14 and stops there. As a result, the valve 20 is driven downwardly by the valve shaft 21 to form an open state.

Figure 3:
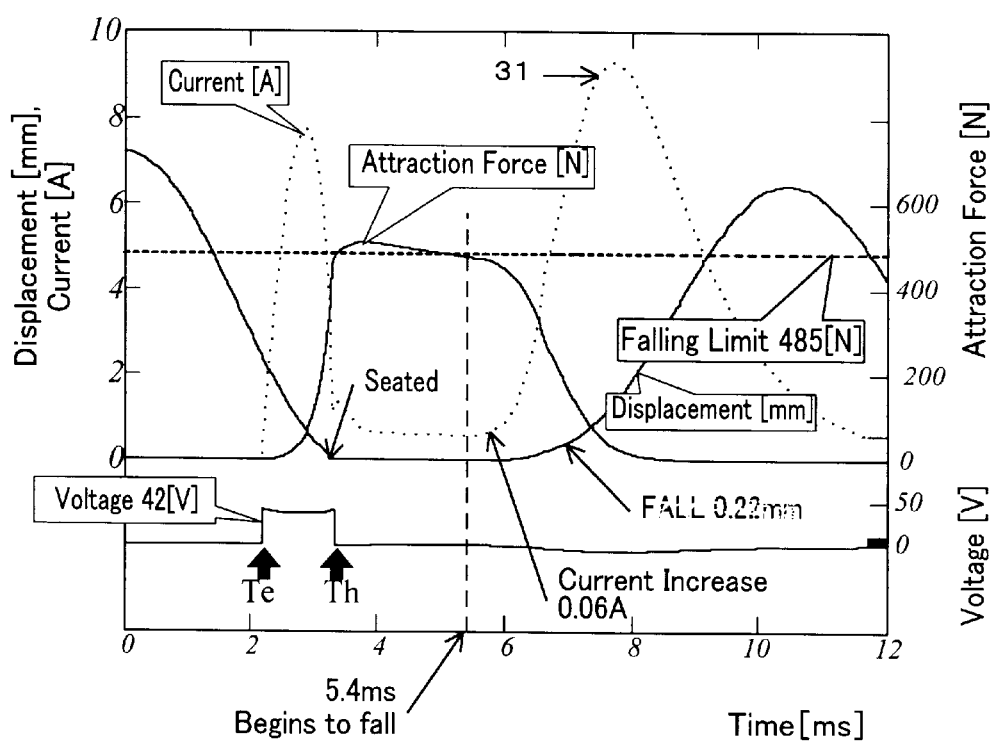
FIG. 3 shows the behavior of various parameters according to one embodiment of the invention when the armature leaves the seating position.

FIG. 3 shows a case where a larger attraction force is required to hold the armature due to secular change and operational variation. A target holding current that has been preset has become not large enough to hold the armature. The armature leaves a seating position. The armature seats at time about 3.6 ms. The attraction power at this time is larger than the leaving limit 485 N by a predetermined value. However, due to certain causes, the electromagnet fails to maintain an attraction force which is larger than the leaving limit, and the attraction force gradually weakens. The attraction power becomes less than the leaving limit around time 5 ms. The armature begins to leave the seated position around time 5.4 ms.

When the armature leaves the seating position, the air gap between the armature and the electromagnet yoke increases, causing magnetic reluctance to begin to increase. So as to reduce variation of the total magnetic flux through the magnetic path, current flowing through the windings of the electromagnet rises as shown by the reference number 31 in FIG. 3. When holding of the armature is performed by constant current control, the drive circuit assumes a flywheel operation and no power is supplied from the power source. Therefore, magnetic energy of the electromagnetic actuator is consumed by a rapid rise of the current. As a result, magnetic energy is consumed by copper loss of the windings and eddy current loss, accelerating reduction of the magnetic flux. As a result, leaving of the armature is promoted.

As can be seen in the drawing, a little while after the attraction power becomes lower than the leaving limit, variation of the armature displacement is gentle. Leaving distance becomes 0.2 mm in 1.7 ms. In contrast, the variation of the current through the windings after the armature begins to leave is steep. The current increases about 10% (0.06 A) in about 0.3 ms after the attraction power fell below the leaving limit. Therefore, leaving of the armature can be expected or detected in advance based on variation of the current through the windings. Responsive to the early detection or estimation of leaving of the armature, pullback operation may be initiated at an early stage, which will enable completion of the pullback operation with small energy.

Figure 4:
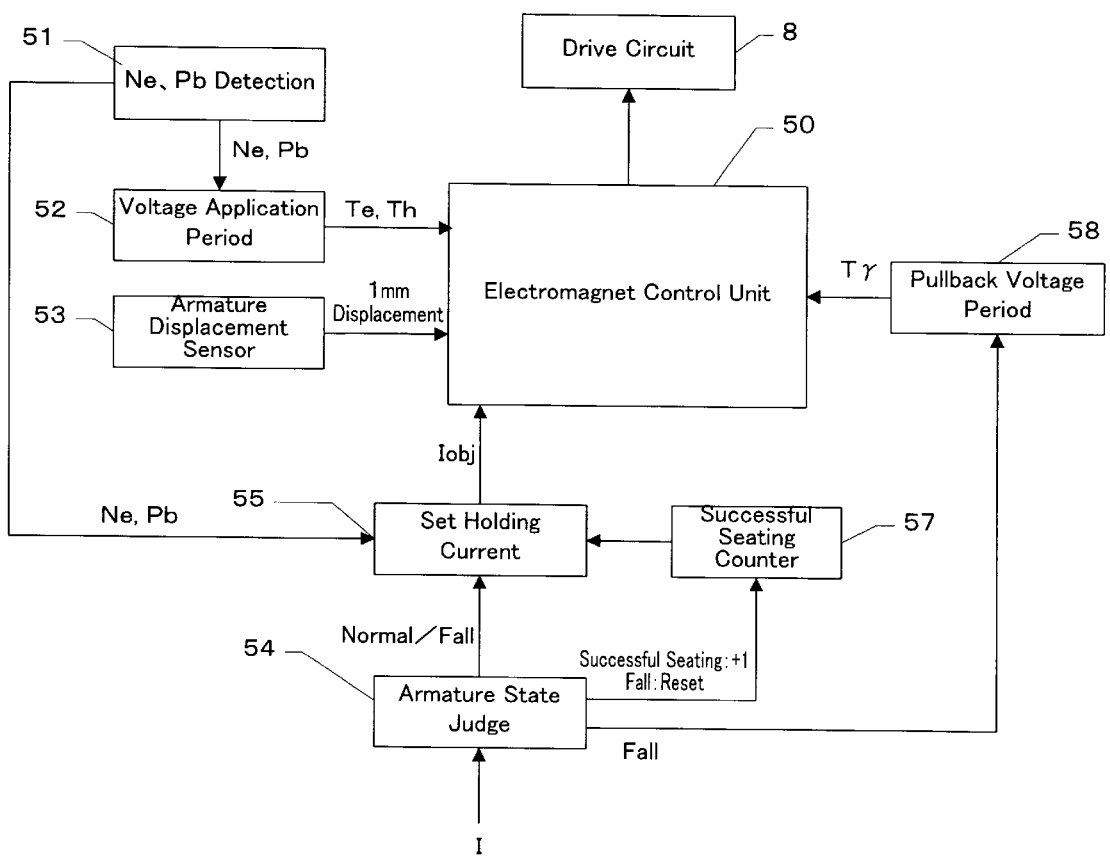
FIG. 4 is a functional block diagram of a controller of an electromagnetic actuator according to one embodiment of the invention.

FIG. 4 is a detailed functional block diagram of the electromagnetic actuator controller 1. An electromagnet controlling unit 50 controls the drive circuit 8 so that a constant voltage is applied to windings of the electromagnet during over-excitation operation for attracting the armature. The control unit 50 controls the drive circuit 8 so that a constant current is supplied to the windings of the electromagnet during holding operation for holding the armature.

Ne, Pb detecting unit 51 detects engine speed Ne based on the output from an engine speed sensor, and detects inlet pipe pressure Pb based on the output from an inlet pipe pressure sensor. Pb is a parameter expressing a load condition of the engine, and Ne is a parameter indicating a rate of the valve of an engine, or a rate of the armature. An armature displacement sensor 53 detects displacement (lift) from a yoke surface (a seating surface) of the armature.

A voltage application period determination unit 52 determines over-excitation start time Te and over-excitation completion time Th based on Ne and Pb. Specifically, the determination unit 52 refers to the relations among Ne, Pb, and Te that are prepared beforehand and are stored in the ROM 3. It also refers to an over-excitation timing map which indicates the relations among Ne, Pb, and Th. The determination unit 52 determines the starting time Te and the finishing time Th based on present Ne and Pb. The starting time Te and finishing time Th are indicated in terms of the time from the point that the armature is released from the seated surface and moved 1 mm. The over-excitation timing map is made so that application period of voltage gets longer as the load becomes larger.

In another embodiment, the over-excitation timing map indicates relations among Ne, Pb, and application voltage. In this case, the map is prepared such that as the load increases the application voltage becomes bigger. In further another embodiment, the over-excitation timing map includes both of application voltage and application period in addition to Ne and Pb. In addition, the over-excitation timing map may be made based on other parameters such as throttle opening and the temperature of the windings, instead of or in addition to the inlet pipe pressure Pb and the engine speed Ne.

The electromagnet controlling unit 50, responsive to the signal indicating detection of 1 mm displacement of the armature by the displacement sensor 53, starts the over-excitation operation. Specifically, voltage application to windings is started at voltage application start time Te given by the application period determination unit 52. This voltage application continues till application completion time Th.

When voltage application completion time Th has passed, a holding current setting unit 55 refers to the holding current map stored in the ROM 3 to determine a target holding current $I_{obj}$, which is passed to the electromagnet controlling unit 50. The electromagnet controlling unit 50 controls power supply to the windings so that the current becomes equal to the target holding current. The holding current map is a map indicating correspondency of Ne, Pb and the target holding current. The larger the load becomes, the larger the target holding current value is according to the map.

An armature state judging unit 54 monitors the current flowing through the windings after the over-excitation completion time Th has passed. If the current reaches the target holding current, a successful seating counter is incremented as it indicates that the armature has successfully seated. The successful seating counter is a counter indicating how many times the armature has consecutively succeeded in seating. One successful seating counter is provided at each of a closed valve side and an open valve side of a single valve.

In the electromagnetic actuator 100 shown in FIG. 2, for example, one successful seating counter is provided to the first electromagnet 11 and another counter is provided to the second electromagnet 13. The successful seating counter provided to the first electromagnet 11 is incremented when the armature successfully seated on the yoke 12 of the first electromagnet in a close valve operation of valve 20. The successful seating counter provided to the second electromagnet 13 is incremented when the armature successfully seated on the yoke 14 of the second electromagnet in an open valve operation of valve 20.

In a holding operation after the armature seated, when the current through the windings increases more than a predetermined value over the target holding current, armature state judging unit 54 determines that the armature is leaving. In this case, the armature state judging unit 54 resets the successful seating counter.

Pullback voltage application period determination unit 58, responsive to a determination of leaving of the armature by armature state judging unit 54, determines period Tγ for applying pullback voltage to the the windings so as to pullback the armature to the seating position. In one embodiment of the invention, period Tγ is of a predetermined length (for example, 0.1 ms). In another example period Tγ is determined with reference to a pullback over-excitation map. This map indicates correspondence of period Tγ and the difference between the time armature leaving is determined and the predetermined time planned for releasing the armature. The electromagnet controlling unit 50 controls drive circuit 8 to apply pullback voltage of a predetermined magnitude to the windings during period Tγ given by the application period determination unit 58.

A holding current setting unit 55, responsive to a determination of leaving of the armature by armature state judging unit 54, sets the target holding current to a higher value by a predetermined value. In response, the electromagnet controlling unit 50 controls the drive circuit 8 such that the current through the windings equals the newly set target holding current after the pullback voltage application period.

When the count of the successful seating counter is equal to or more than a predetermined count, that is, when the armature successfully seated a consecutive predetermined number of times without leaving the seating position, the holding current setting unit 55 resets the target holding current to a lower value by a predetermined magnitude, and passes it to the electromagnet controlling unit 50. In response to this, the electromagnet controlling unit 50 controls the drive circuit 8 so that the current through the windings approaches the new target holding current.

When leaving does not occur after the holding current is made smaller, the target holding current value is lowered little by little until leaving of the armature takes place. In this manner, the holding current is optimized to a lowest possible value in accordance with variation and secular changes of the armature and power consumption is reduced.

Referring to FIG. 5(a), pullback operation of the armature in accordance with one embodiment of the invention will be described. At time 0 ms, the armature is released from the yoke of the electromagnet and starts to displace. When the armature displacement reaches about 2 mm, namely at time Te, over-excitation operation is started by applying voltage 42 V to the windings. Application of voltage continues till time Th where the over-excitation operation terminates and the armature seats. If for some reasons the attraction power falls below the leaving limit 485 N, the armature begins to leave around time 5.4 ms. When the armature leaves, the current through the windings of the electromagnet increases as shown by reference number 71. In response to detection of this current increase, pullback operation starts.

Figure 5:
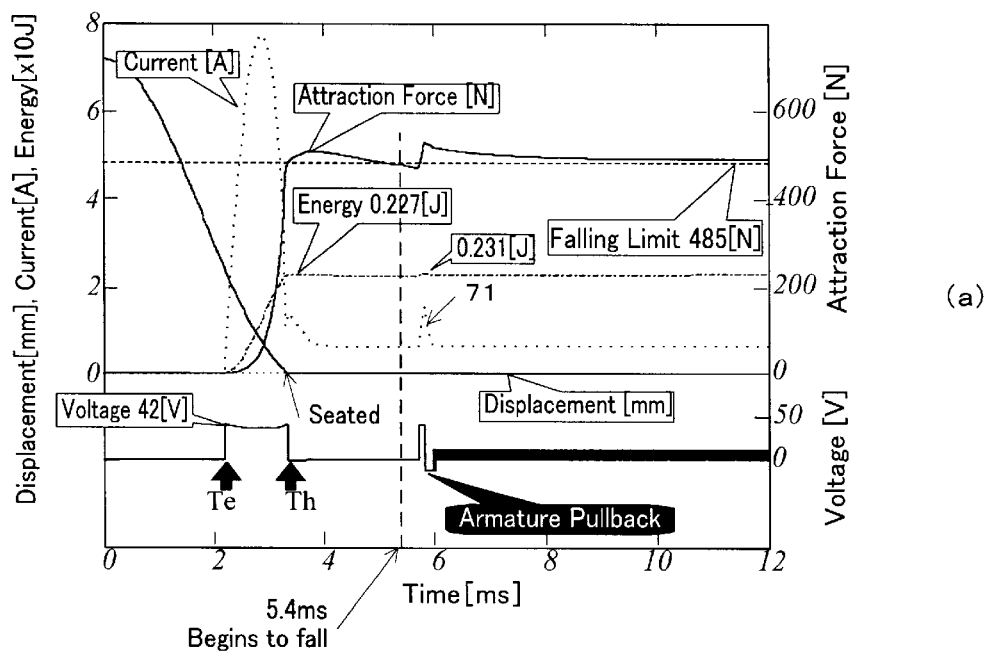
FIGS. 5a and 5b shows the behavior of various parameters in pullback operation when the armature leaves the seating position.
Figure 5:
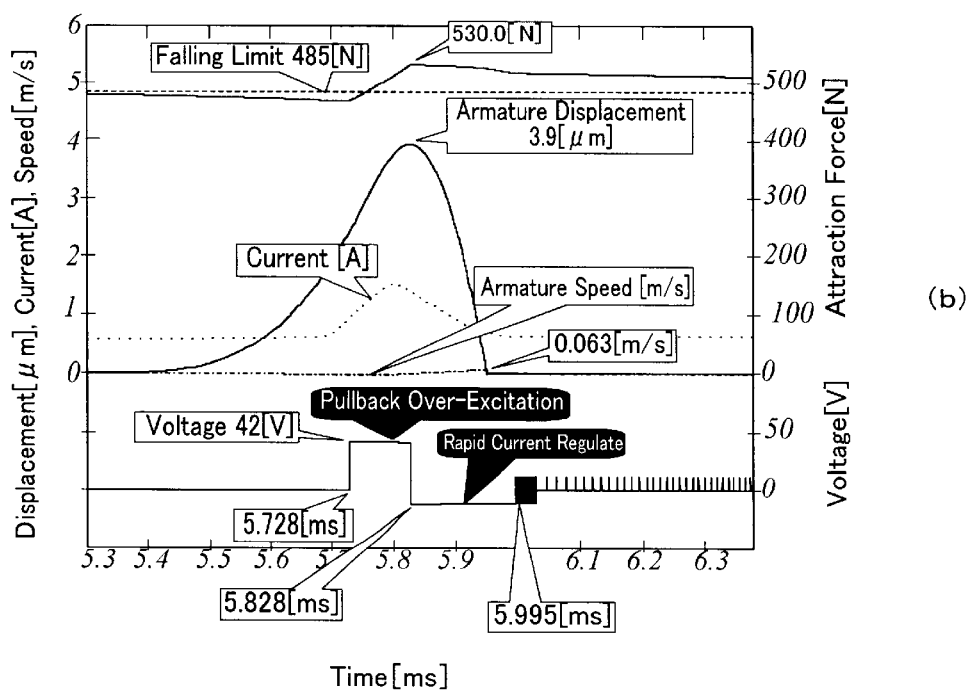

FIG. 5(*b*) is a magnified drawing showing that portion of FIG. (*a*) where the armature starts to leave and is pulled back. The armature starts to leave around time 5.4 ms, and starts to displace. In response, the current through the windings of electromagnet starts to increase. When the current increases by a predetermined ratio over the target holding current, it is judged that the armature is leaving. In the drawing, this judgment is made at time 5.728 ms. The predetermined ratio may be set, for example, at 10% of the target holding current.

In response to the judgment of leaving, over-excitation operation for pulling back the armature is started. Over-excitation voltage of 42 V is applied for a predetermined period (in this embodiment, 0.1 ms). As the over-excitation power is supplied, the attraction power becomes larger (530.0 N in the drawing) than the leaving limit. As can be seen from FIG. 5(*b*), the current rises too.

Over-excitation operation finishes at time 5.828 ms. Then, the target holding current value is set to a value 10% larger than before so as to prevent the armature from leaving. The ratio of increase can be any appropriate value. In order to make the current converge to the new target holding current quickly, −12V is applied (the period of this voltage application is referred to as rapid current regulation period). When the current reaches the new target holding current value at time 5.995 ms, switching control of ±12V is carried out for a very short period (5.995–6.03 ms). This is done in order to make the current through the windings converge to the target holding current value quickly. Then, switching control shifts to switching between +12V and 0V so as to maintain the current at the target holding current value. This shift to switching between +12V and 0V is made to reduce power consumption. As an alternative, switching between +12V and −12V may be continued.

As is apparent from FIG. 5(*b*), leaving of the armature is limited to a very small distance (about 3.9 μm), and leaving ends in a very short period (about 0.55 ms). Seating speed of the armature in the pullback operation is as small as 0.06 m/s, and no substantial sound is generated. Because the over-excitation period for pullback is 0.1 ms, increase of the used energy is at most 0.004 J.

Figure 15:
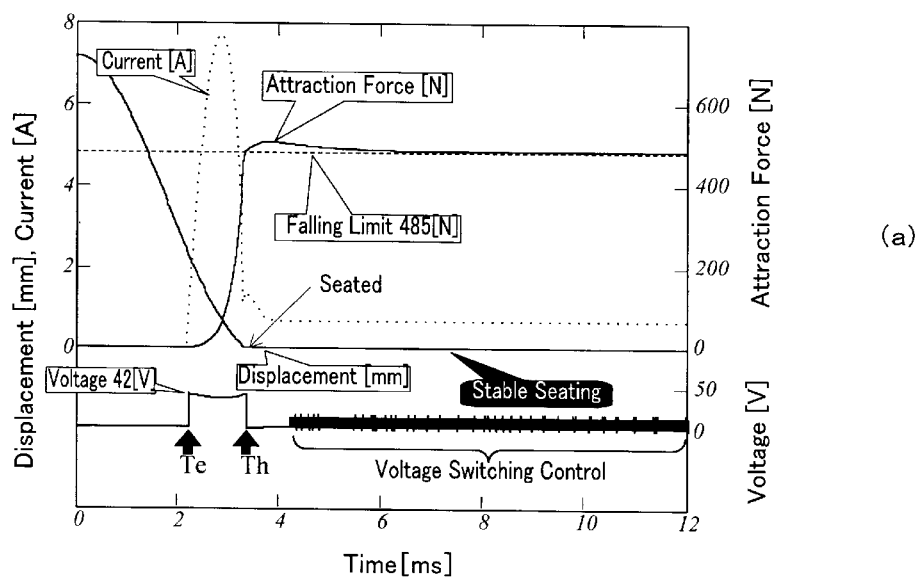
FIGS. 15(a) and (b) show behavior of various parameters according to a conventional.
Figure 15:
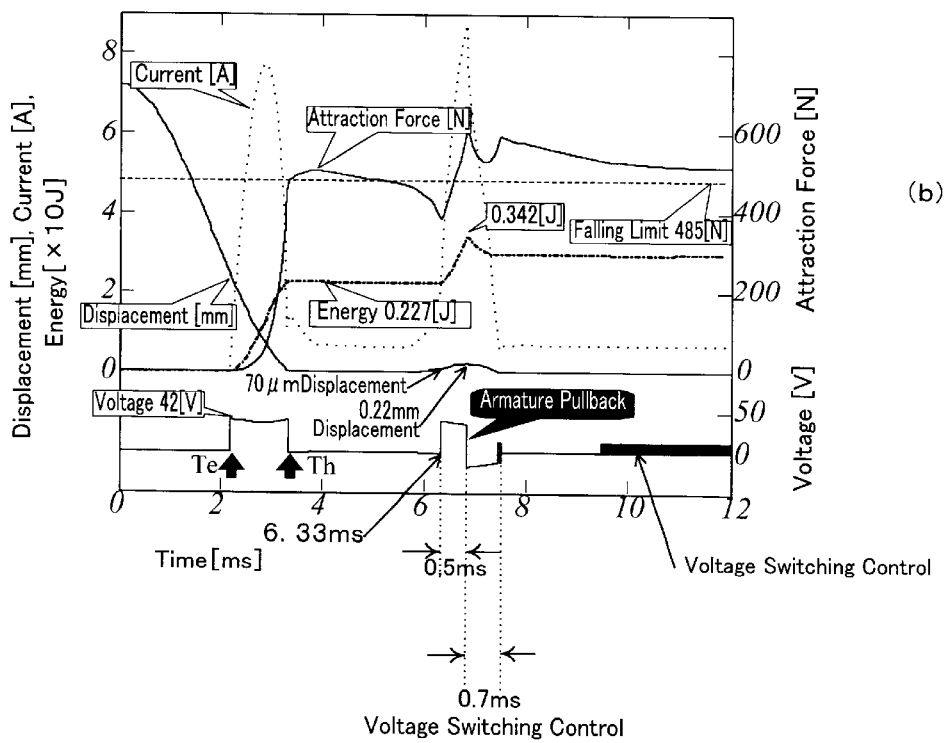

Thus, in contrast to the conventional scheme that was described heretofore referring to FIG. 15, according to the invention, leaving of the armature is detected at an early stage, and the pullback operation is started at an early stage. Therefore, leaving of the armature is limited to a small distance and the energy required to pull it back is very small.

According to one embodiment of the present invention, the period of the pullback operation is regulated as described hereafter in accordance with the time the armature stars to leave.

Figure 6:
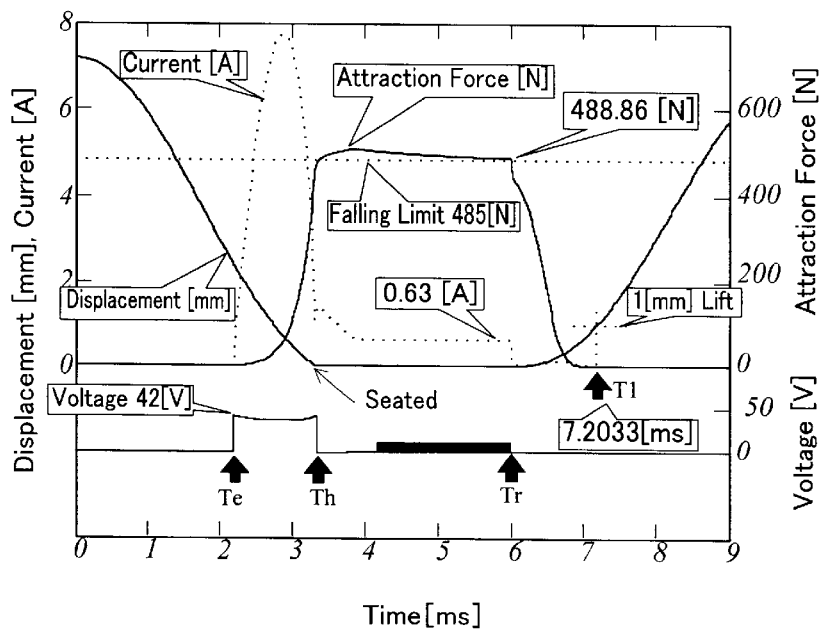
FIG. 6 shows the behavior of various parameters in normal operation of the armature according to one embodiment of the invention.

FIG. 6 shows a normal seating and releasing operation of the armature where the armature does not leave. At time 0 ms, the armature is released and stars to displace. Voltage 42V is applied to the windings from time Te through Th and the armature seats normally. The attraction force is larger than the leaving limit 485 N till time Tr, which is a scheduled time releasing the armature. Time Tr is predetermined based on valve timing and engine speed Ne. At time Tr, the armature is released. In FIG. 6, the armature displaces or lifts 1 mm at time T1, which is 7.2033 ms.

Figure 7:
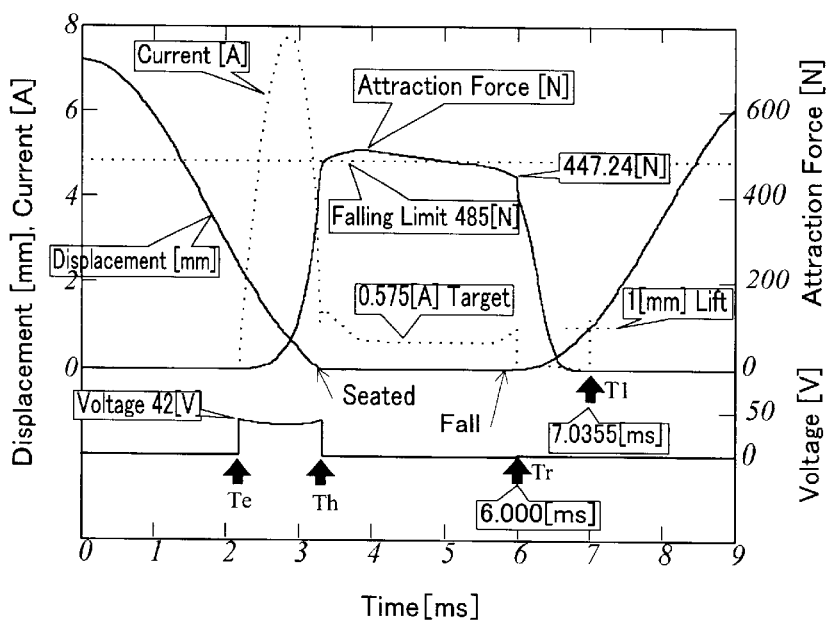
FIG. 7 shows the behavior of various parameters when the armature leaves the seating position around the scheduled release time according to one embodiment of the invention.

FIG. 7 shows the case where the armature leaves before it is released. For some reasons, attraction power falls to a smaller value (447.24 N) which is below the leaving limit. The armature starts to leave or lift at time 5.4 ms. At the scheduled release time Tr, the armature has already started to fall or lift to cause a displacement. Thus, time T1 of 1 mm displacement is 7.0355 ms in contrast to 7.2033 ms in the case of FIG. 6.

Figure 8:
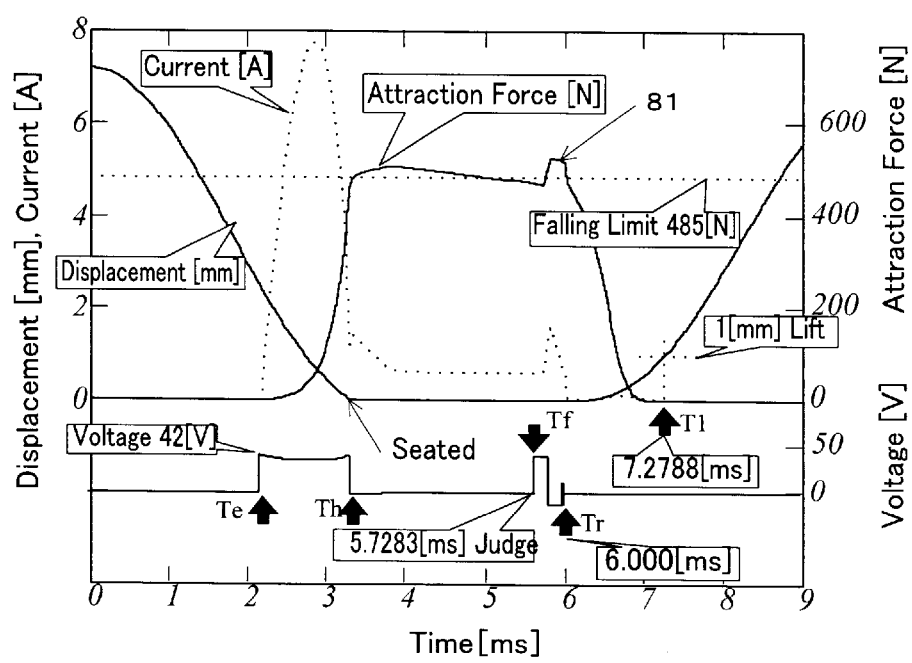
FIG. 8 shows the behavior of various parameters when the armature leaves around the scheduled release time, and pullback operation has been carried out according to one embodiment of the invention.

Referring to FIG. 8, pullback operation is activated to the leaving state as shown in FIG. 7. Responsive to judgment of leaving of the armature at time Tf (5.7283 ms), over-excitation operation for pullback is activated and voltage is applied to the windings. With this voltage application, attraction power rises above the leaving limit as shown by reference number 81. The attraction power remains high at the scheduled release time Tr (6.0 ms). Thus, time T1 of 1 mm displacement lags to 7.2788 ms in contrast to 7.2033 ms in the case of FIG. 6.

The armature pullback operation activated immediately before the scheduled release time causes delay in the armature release operation because of a relatively large attraction force. This will cause a delay in the valve timing possibly generating significant adverse effects to the engine. According to one embodiment of the invention, time lag of the valve timing in the pullback operation is avoided by the following steps.

1) calculating the difference between the scheduled armature release time Tr and the judged leaving of the armature time Tf;
2) if the difference Tr−Tf is equal to or larger than a predetermined value, performing a full pullback operation as indicated in FIGS. 5(*a*) and (*b*);
3) if the difference Tr−Tf is smaller than the predetermined value, applying voltage for pullback for shortened period Tγ. As the voltage application period is shortened, the rapid current regulation period thereafter is also shortened correspondingly because increase of the current due to voltage application is lower.

The predetermined value may be determined based on the estimate of the voltage application period required for pullback and the rapid current regulation period. For example, referring to FIG. 5, the voltage application period for pullback is set to 0.1 ms. The period for rapid current regulation is estimated to be 0.167 ms (such estimate can be made based on actual data, for example). The predetermined value can be set to 0.28 ms, that is the sum of the voltage application period of 1 mm and the rapid current regulation period 0.167 ms plus a tolerance.

Figure 9:
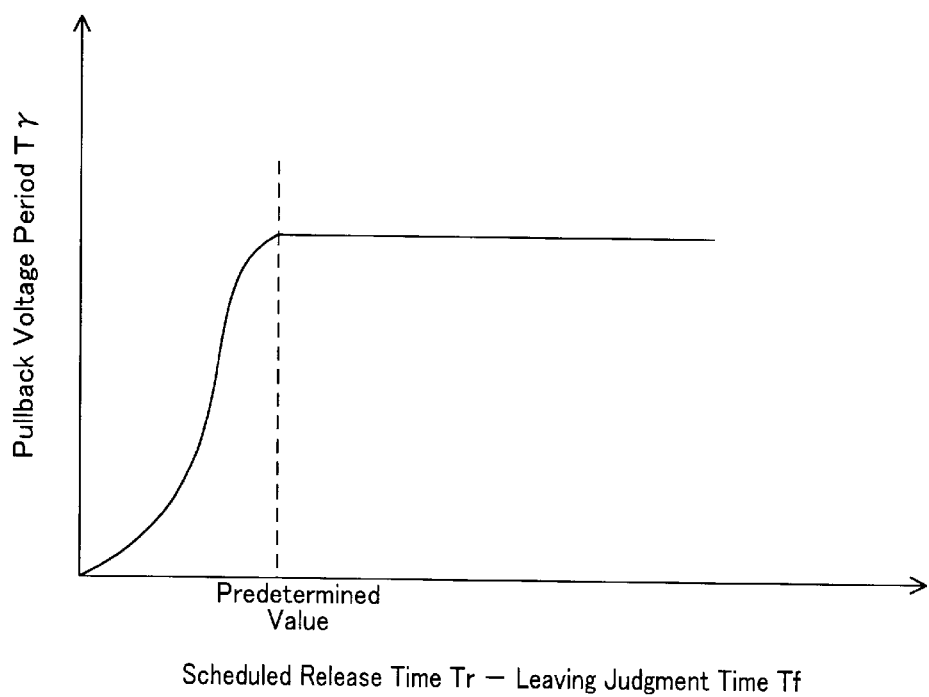
FIG. 9 illustrates relationship between Tr–Tf and Tγ.

FIG. 9 illustrates an example of pullback over-excitation map, which indicates the relation between the difference Tr−Tf and the pullback voltage application period Tγ. When Tr−Tf is less than the predetermined value, the period Tγ reduces as the difference Tr−Tf reduces. When Tr−Tf is equal to or more than the predetermined value, the period Tγ is constant, enabling a full pullback operation.

Figure 10:
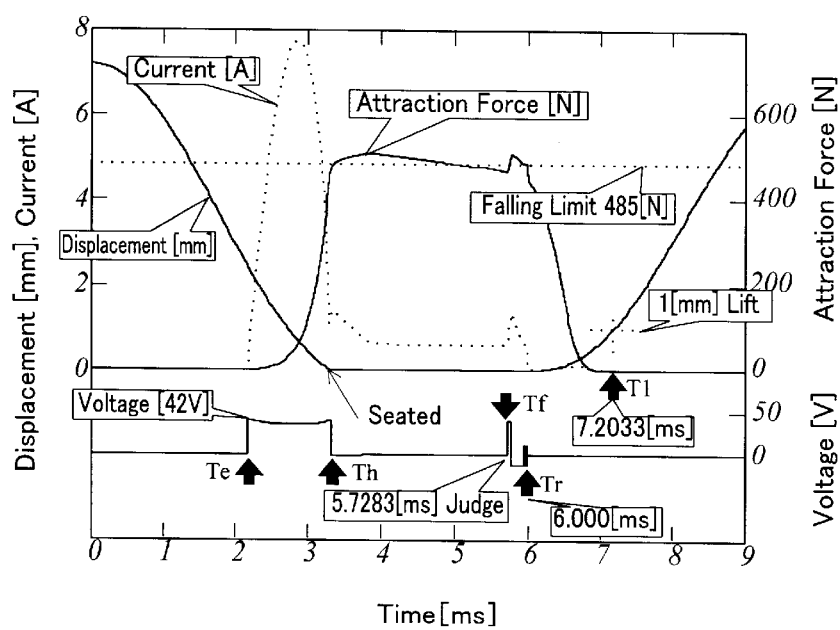
FIG. 10 shows the behavior of various parameters according to one embodiment of the invention.

Referring to FIG. 10, a scheme for avoiding delay in the valve timing will be described. At time Tf (5.7283 ms), judgment is made that the armature leaves. Time Tr is the scheduled armature release time. Here, Tr−Tf=6.000−5.7283=0.2717 ms. Assume that the above mentioned predetermined value is set at 0.28 ms for example, the value of Tr−Tf is less than the predetermined value. With reference to the map as shown in FIG. 9, period Tγ corresponding to the value of Tr−Tf is extracted. As a result, pullback operation is performed over a shorter period. Attraction power at time Tr is substantially the same as the attraction power at time Tr in FIG. 6. Time T1 of 1 mm displacement is 7.2033 ms, which is the same timing as the normal releasing of the armature in FIG. 6.

Thus, time lag of the armature release operation can be avoided by adjusting the period of the pullback operation in accordance with the timing that the armature leaves.

Figure 11:
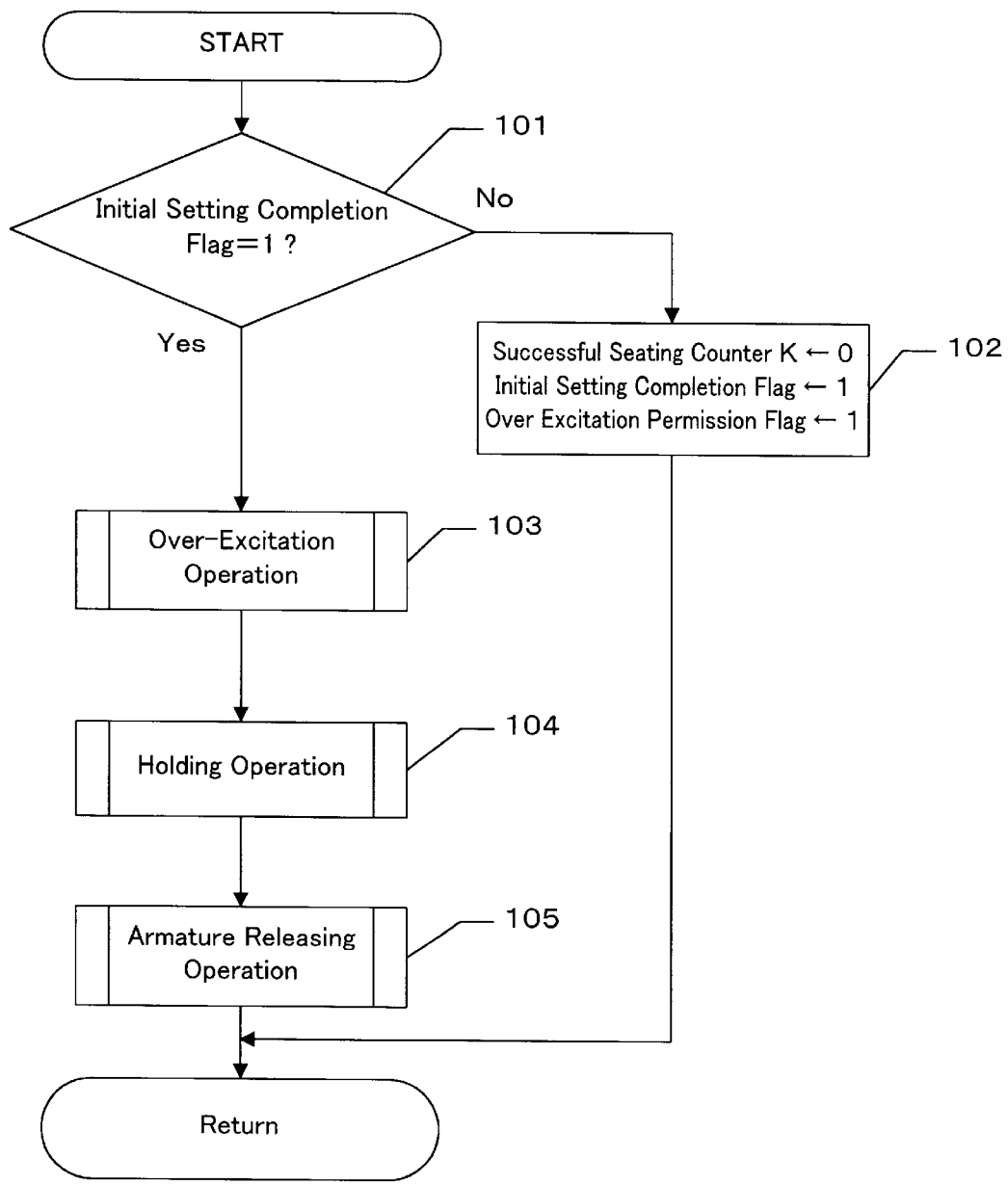
FIG. 11 is a flowchart showing general flow of controlling an electromagnetic actuator according to one embodiment of the invention.

FIG. 11 is a flow chart showing the process of controlling the electromagnetic actuator in accordance with one embodiment of the invention. This process is repetitively carried out with a constant interval. In step 101, initial setting flag is checked to see if it is "1". This flag is set when initial setting is done. When this process is entered for the first time, the initial setting has not been done. Thus, the process proceeds to step 102 to make the initial settings. That is, the successful seating counter K is set to "0". Then, the value 1 is set in the initial setting completion flag and value 1 is set to the over-excitation operation permission flag indicating that the next over-excitation operation is permitted.

Next time this routine is entered, the process proceeds to step 103 as the value of the initial setting completion flag is "1", and over-excitation operation routine is executed to make the armature seated. After completion of the over-excitation operation routine, the process proceeds to step 104 to perform holding operation routine maintaining seated state of the armature. In step 105, at the scheduled release time of the armature, armature release operation routine starts.

Figure 12:
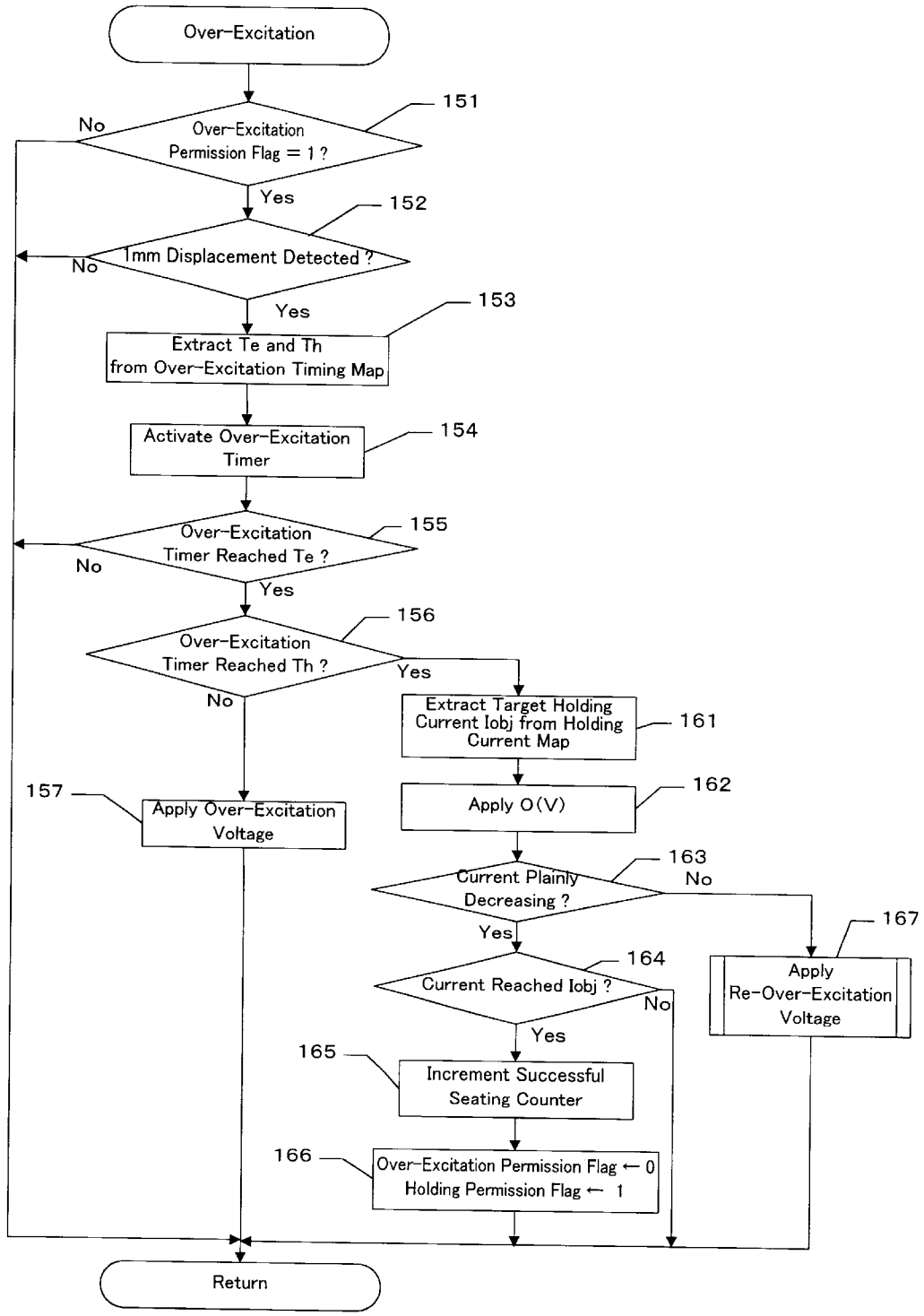
FIG. 12 is a flowchart showing over-excitation operation according to one embodiment of the invention.

FIG. 12 is a flowchart of the process of the over-excitation operation routine executed in step 103 of FIG. 11. In step 151, determination is made whether or not value 1 is set in the over-excitation operation permission flag indicating that the initial setting has been completed. If it is "1", the process proceeds to step 152 to determine if 1 mm displacement has been detected. If it has not been detected, the process leaves this routine. If it has been detected, pre-stored over-excitation timing map is looked up so as to extract over-excitation starting time Te and over-excitation completion time Th which are set based on the time of 1 mm displacement (153). In step 154, an over-excitation timer set to zero is started. This timer counts up.

In step 155, if the over-excitation timer has not reached over-excitation start time Te, the process exits the routine. If has reached Te, the process proceeds to step 156. When the time has reached over-excitation start time Te first time from 1 mm displacement detection point, the process proceeds to step 157 to apply over-excitation voltage as decision of step 156 is No. In step 156, application of over-excitation voltage is carried out till the over-excitation timer reaches over-excitation completion time Th.

When the over-excitation timer reaches over-excitation completion time Th in step 156, application of voltage finishes. Steps 161 through 167 are performed to make the armature seated. In step 161, pre-stored holding current map is referred to so as to extract target holding current $I_{obj}$ based on current Ne and Pb. In step 162, 0V is applied for a predetermined period. This is because the current through the windings is large relative to the target holding current when over-excitation finished.

In step 163, judgment is made whether the current through the windings is plainly decreasing for the predetermined period. This plain decrease of the current indicates successful seating. When the armature is moving to a seating position with the distance to the seating position decreasing, magnetic energy stored in the gap between the armature and the yoke of electromagnet is being converted into mechanical work and a magnetic path is closing. Accordingly, the current plainly decreases. When the armature has already been seated, magnetic energy is converted into copper loss and eddy current loss, and the current decreases plainly. Plain decrease of the current can be determined by checking the change of the current per unit time. If the change shows a larger decrease than a predetermined value, plain decrease of the current can be determined.

In step 163, if the current is not decreasing plainly, it indicates that the armature has not seated normally by the voltage application performed in step 157. Over-excitation operation is performed again (167) for a predetermined period such as 1 ms.

When this routine is entered after the re-over-excitation and it is determined in step 163 that the current has decreased plainly, the current through the windings is examined to determine if it has reached the target holding current extracted in step 161 (step 164). If it has not reached the target holding current, the process exits this routine. If it has reached the target holding current indicating that the armature seated successfully, a successful seating counter is incremented (165). As the over-excitation operation finished normally, the over-excitation permission flag is set to zero and the holding operation permission flag is set to "1" in order to perform the holding operation (166).

Figure 13:
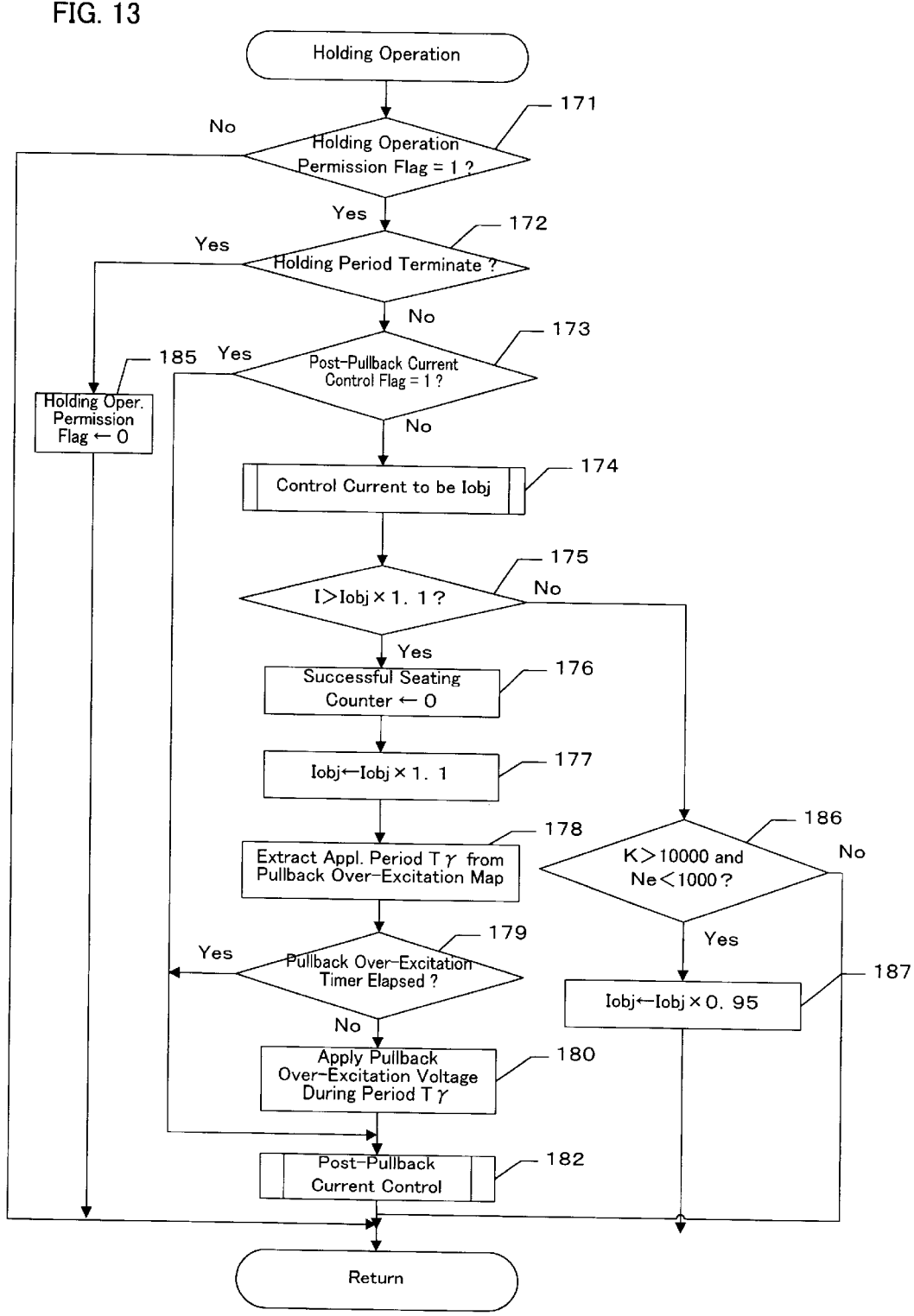
FIG. 13 is a flowchart showing holding operation according to one embodiment of the invention.

FIG. 13 is a flowchart showing the holding routine performed in step 104 of FIG. 11. In step 171, the holding operation permission flag is examined to determine if it is "1" indicating that the over-excitation operation routine has completed. If it is not "1", the process exits this routine. If it is "1", the process proceeds to step 172 to determine if holding operation period has finished. This period is a period that is preset in accordance with the scheduled release time of the armature. When this routine is entered for the first time, the process proceeds to step 173 since the holding operation period has not finished. In step 173, a post-pullback current control flag is examined to determine if it is "1", indicating that post-pullback current control is being carried out (step 182, to be described referring to FIG. 14). When this routine is entered for the first time, the post pullback current control has not been performed and the flag just described is "0". The process proceeds to step 174.

In step 174, power supply to the windings is controlled so as to keep the current through the windings at the target holding current $I_{obj}$ that is extracted in step 161 of FIG. 12. This is done, for example, by performing a switching control with the voltage switched between 0V and +12V. Thus, the armature is held at the seating position.

When the armature leaves the seating position while control is being performed so as to maintain the current at the target holding current, the current through the windings increases automatically. In step 175, if the current increases more than 10% over the target holding current, it is judged that the armature is leaving the seating position, and the successful seating counter is reset (176). The target holding current is renewed to a value 10% larger than before (177).

As described heretofore referring to FIG. 10, voltage application period Tγ is extracted from the pre-stored pullback over-excitation map (178). The period Tγ is predetermined in accordance with the difference between the time Tf and the time Tr. The period Tγ is set in a pullback over-excitation timer (a down-timer) and the timer is started. In steps 179 and 180, voltage is applied the windings till the period Tγ ends.

When this routine is entered again, the process proceeds to step 182 if the pullback over-excitation timer has reached zero. Post pullback current control routine (FIG. 14) is performed to make the armature seat.

In step 175, the process proceeds to step 186 if the current through the windings has not reached a value 10% larger than the target holding current. In 186, it is determined whether the successful seating counter has a value larger than a predetermined value (for example, 10000) and the engine speed Ne is lower than a predetermined value (for example, 1000 rpm). If the determination is positive, the present target holding current value is set to a value that is 5% smaller than before (187). This is done in order to revise the holding current value to a lowest possible value necessary for maintaining a seated state. Thus, the target holding current is gradually lowered when leaving of the armature does not take place until resulting in a leaving of the armature takes place. This way, the target holding current value is revised to an optimum value for the electromagnetic actuator.

Revolution speed Ne is included in the conditions for correcting the target holding current value because it is not appropriate to change the holding current when the armature is moving at a high speed. Depending on the applications, revolution speed may not be included in the conditions. The predetermined value of the successful seating counter and the predetermined value of the revolution speed may be set to any desirable values.

When time passes and the preset holding operation period finishes, decision step 172 turns to Yes. The process proceeds to step 185 and the holding operation permission flag is set to zero. The process exits this routine.

Figure 14:
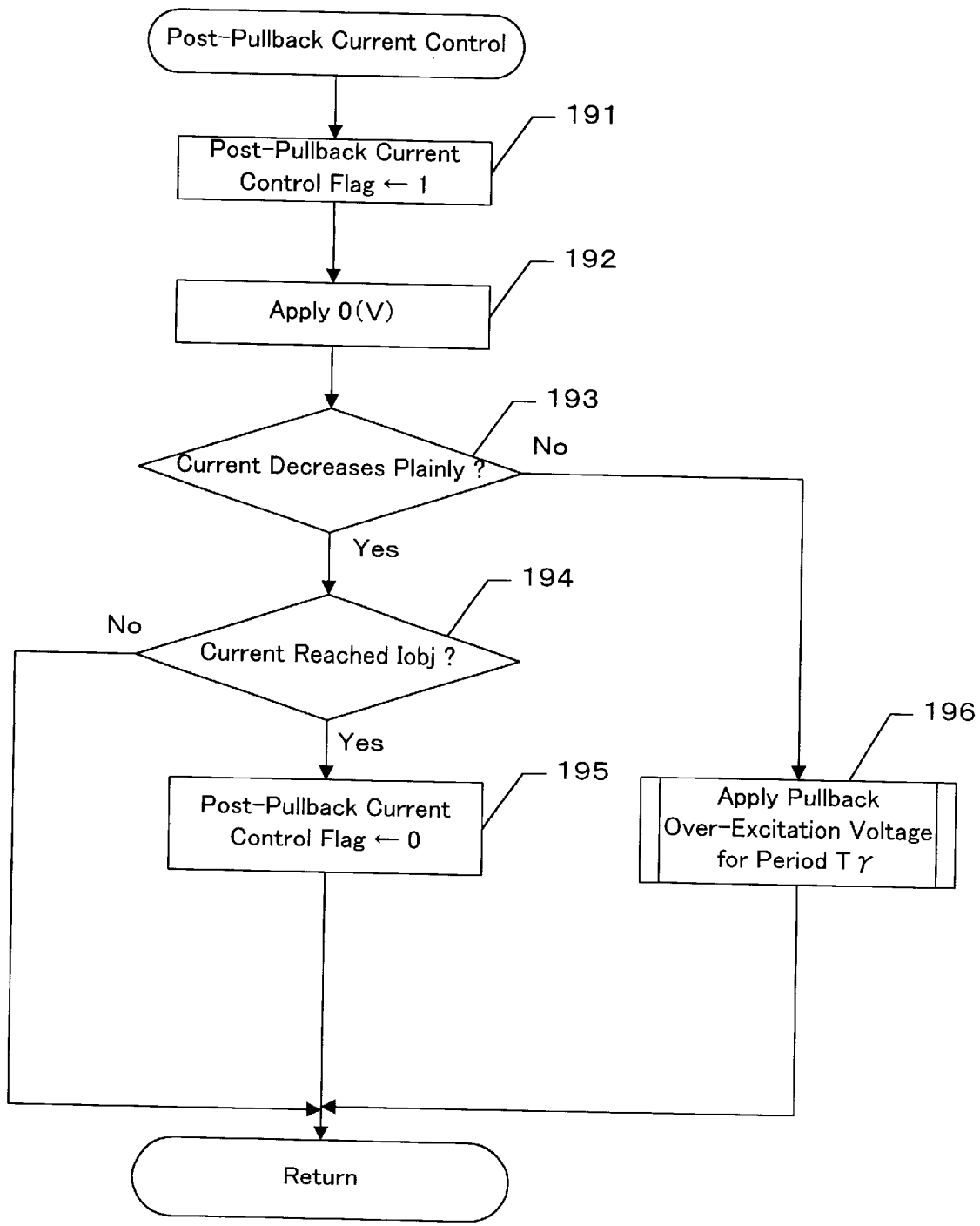
FIG. 14 is a flowchart showing post-pullback current control according to one embodiment of the invention.

FIG. 14 is a flowchart of the post-pullback current control routine to be performed in step 182 of FIG. 13. In step 191, the post-pullback current control flag is set to "1" indicating that the post-pullback current control routine is being performed. When this flag is set to "1", such activities as current control and pullback over-excitation are not performed as described with respect to step 173 of FIG. 13.

In step 192, 0V is applied for a predetermined period. This is because the current through the windings is larger than the target holding current when over-excitation operation for pullback finishes. The process proceeds to step 193 to judge whether the current decreases plainly for the predetermined period. Plain decrease of the current indicates a successful seated state as described above.

When the current is not decreasing plainly, the armature has not been pulled back to the seating position yet. The same over-excitation operation as the one carried out in step 180 is carried out again (196). That is, voltage is applied to the windings of the electromagnet for period Tγ.

After re-over-excitation operation for period Tγ, when the process enters this routine again and plain decrease of the current is detected, the current is examined to see if it reached the target holding current $I_{obj}$ (step 194). If the current has not reached the target holding current, the process exits this routine. If it has reached the target current, the post-pullback current control flag is set to zero indicating that pullback to a seating position of the armature was successful.

An embodiment of the invention has been described. The value of applied voltage (42V), the value of voltage in switching control (±12V) are merely examples and are not intended to limit the invention. Different voltages can also be used. For example, holding operation can be carried out with a 42V power source.

While the invention has been described with respect to specific embodiments, such embodiments are not intended to limit the scope of the invention.

What is claimed is:

1. A controller for controlling an electromagnetic actuator having a pair of springs acting on opposite directions, an armature coupled to a mechanical element, said armature connected to the springs to be held in a neutral position given by the springs when the armature is not activated, and a pair of electromagnets for driving the armature between two end positions, the controller comprising:

current supplying means for supplying holding current to the electromagnet corresponding to one of the end positions when holding the armature in said one of the end positions; and determination means for determining that the armature leaves the end position when the holding current increases more than a predetermined value while the holding current is supplied to the electromagnet corresponding to said end position.

2. The controller according to claim 1, further comprising pullback means, responsive to determination of leaving of the armature by the determination means, for applying voltage to the electromagnet corresponding to said end position to pullback the armature to said end position.

3. The controller according to claim 2, wherein said current supplying means raises the holding current by a predetermined value to supply to the electromagnet corresponding to said end position after voltage is applied to said electromagnet by the pullback means.

4. The controller according to claim 2, further including setting means for setting the period for applying voltage to the electromagnet by said pullback means, in accordance with the difference between the time the armature leaves the end position as determined by said determination means and a scheduled release time of the armature.

5. The controller according to claim 4, wherein the setting means shortens the period of voltage application to the electromagnet by said pullback means when the difference between the time the armature leaves the end position as determined by said determination means and a scheduled release time of the armature is equal to or less than a predetermined period.

6. The controller according to claim 1, further including a counter for counting the number of times the armature is held in the end position without leaving over a sequence of cycles, wherein when the number of times shown by the counter is larger than a predetermined value, the supplying means decreases the holding current to the electromagnet corresponding to said end position.

7. A program executable by a computer for controlling an electromagnetic actuator having a pair of springs acting on opposite directions, an armature coupled to a mechanical element, said armature connected to the springs to be held in a neutral position given by the springs when the armature is not activated, and a pair of electromagnets for driving the armature between two end positions, the program being structured to:

supply holding current to the electromagnet corresponding to one of the end positions when holding the armature in said one of the end positions; and determine that the armature leaves the end position when the holding current increases more than a predetermined value while the holding current is supplied to the electromagnet corresponding to said end position.

8. The program according to claim 7, further structured to apply voltage to the electromagnet corresponding to said end position to pullback the armature to said end position responsive to determination of leaving of the armature.

9. The program according to claim 8, wherein the holding current is raised by a predetermined value to supply to the electromagnet corresponding to said end position after voltage is applied to said electromagnet.

10. The program according to claim 8, further structured to set the period for applying voltage to the electromagnet in accordance with the difference between the time the armature leaves the end position and a scheduled release time of the armature.

11. The program according to claim 10, wherein the period of voltage application to the electromagnet is shortened when the difference between the time the armature leaves the end position and a scheduled release time of the armature is equal to or less than a predetermined period.

12. The program according to claim 7, further structured to count the number of times the armature is held in the end position without leaving over a sequence of cycles, and to decrease the holding current to the electromagnet corresponding to said end position when said number of times is larger than a predetermined value.

13. Method for controlling an electromagnetic actuator having a pair of springs acting on opposite directions, an armature coupled to a mechanical element, said armature connected to the springs to be held in a neutral position given by the springs when the armature is not activated, and a pair of electromagnets for driving the armature between two end positions, comprising:

supplying holding current to the electromagnet corresponding to one of the end positions when holding the armature in said one of the end positions; and determining that the armature leaves the end position when the holding current increases more than a predetermined value while the holding current is supplied to the electromagnet corresponding to said end position.

14. The method according to claim 13, further comprising:

applying voltage to the electromagnet corresponding to said end position to pullback the armature to said end position responsive to determination of leaving of the armature.

15. The method according to claim 14, wherein the holding current is raised by a predetermined value to supply to the electromagnet corresponding to said end position after voltage is applied to said electromagnet.

16. The method according to claim 14, further comprising:

setting the period for applying voltage to the electromagnet in accordance with the difference between the time the armature leaves the end position and a scheduled release time of the armature.

17. The method according to claim 16, wherein the period of voltage application to the electromagnet is shortened when the difference between the time the armature leaves the end position and a scheduled release time of the armature is equal to or less than a predetermined period.

18. The method according to claim 13, further comprising:

counting the number of times the armature is held in the end position without leaving over a sequence of cycles; and decreasing the holding current to the electromagnet corresponding to said end position when said number of times is larger than a predetermined value.

* * * * *